US011829237B1

(12) United States Patent
Schaub et al.

(10) Patent No.: US 11,829,237 B1
(45) Date of Patent: Nov. 28, 2023

(54) ERROR DETECTION AND RECOVERY WHEN STREAMING DATA

(71) Applicant: Apple Inc., Cupertino, CA (US)

(72) Inventors: Marc A Schaub, Sunnyvale, CA (US); Roy G. Moss, Palo Alto, CA (US); Michael Bekerman, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 326 days.

(21) Appl. No.: 17/193,730

(22) Filed: Mar. 5, 2021

(51) Int. Cl.
*G06F 11/00* (2006.01)
*H03M 13/00* (2006.01)
*G06F 11/07* (2006.01)
*G06F 13/28* (2006.01)

(52) U.S. Cl.
CPC .......... *G06F 11/0793* (2013.01); *G06F 13/28* (2013.01)

(58) Field of Classification Search
CPC .............................. G06F 11/0793; G06F 13/28
USPC ........................................ 370/308, 305, 306
See application file for complete search history.

(56) References Cited

U.S. PATENT DOCUMENTS

| | | | |
|---|---|---|---|
| 7,496,695 B2 | 2/2009 | Go et al. | |
| 7,548,997 B2 | 6/2009 | Go et al. | |
| 7,620,746 B2 | 11/2009 | Go et al. | |
| 7,680,963 B2 | 3/2010 | Go et al. | |
| 7,957,268 B2 | 6/2011 | Appanna et al. | |
| 8,028,103 B2 | 9/2011 | Go et al. | |
| 8,964,791 B2 | 2/2015 | Vu et al. | |
| 10,783,103 B1* | 9/2020 | Jain | G06F 13/28 |
| 2010/0325334 A1* | 12/2010 | Tsai | G06F 15/17 |
| | | | 710/308 |
| 2020/0117626 A1* | 4/2020 | Karguth | G06F 13/4027 |
| 2020/0151055 A1 | 5/2020 | Eom et al. | |

FOREIGN PATENT DOCUMENTS

EP 1014273 A2 6/2000

* cited by examiner

*Primary Examiner* — Christine T. Tu
(74) *Attorney, Agent, or Firm* — Robert C. Kowert; Kowert, Hood, Munyon, Rankin & Goetzel, P.C.

(57) ABSTRACT

Systems, apparatuses, and methods for error detection and recovery when streaming data are described. A system includes one or more companion direct memory access (DMA) subsystems for transferring data. When an error is detected for a component of the companion DMA subsystem(s), the operations performed by the other components need to gracefully adapt to this error so that operations face only a minimal disruption. For example, while one or more consumers are still consuming a first frame, a companion router receives an indication of an error for a second frame, causing the companion router to send a router frame abort message to a route manager. In response, the route manager waits until the consumer(s) are consuming the second frame before sending them a frame abort message. The consumer(s) flush their pipeline and transition to an idle state waiting for a third frame after receiving the frame abort message.

20 Claims, 16 Drawing Sheets

ERROR DETECTION AND RECOVERY WHEN STREAMING DATA

BACKGROUND

Technical Field

Embodiments described herein relate to the field of computing systems and, more particularly, to efficiently streaming data between multiple agents.

Description of the Related Art

Direct memory access (DMA) is a feature of computer systems that allows hardware subsystems to access system memory independently of the main processor (e.g., central processing unit (CPU)). The type of data being transferred in a DMA access can vary from embodiment to embodiment. One common type of data that is transferred in a computer system is image data, although the techniques described herein are not limited to the transfer of image data. The transferring of other types of data may also benefit from the improved methods and mechanisms disclosed in this specification. However, for the purposes of illustration, the transfer of image data will be used for many examples. These examples are merely illustrative and do not preclude transfer of other types of data using the techniques described herein.

Computer systems (e.g., phones, tablets, laptops, desktops) often include or are connected to cameras or other image sensors for capturing image data such as video images or still pictures. Such image sensors may generate a stream of image data (commonly referred to as an "image data stream") that includes a series of individual pictures or frames. Each frame may include multiple lines of pixel data that specify a brightness and color of a given pixel. As used herein, the term "stream" is defined as a sequence of frames that will be undergoing any of a variety of types and amounts of processing.

Prior to displaying the image data stream on a monitor or other suitable display device, the data included in the image data stream may be processed in order to adjust color values, rotate or scale the image, and the like. To facilitate such processing, the image data stream may be stored in memory so that dedicated circuit blocks, such as a display processor, can operate on portions of a particular frame of the image data stream. In some cases, a display processor may also store the processed image data stream back into memory for future use.

During transfer of image data between different components of the system, various problems can occur that delay or prevent proper transfer of the data. For example, when one side of a DMA link crashes, the other side of the DMA link is unable to make forward progress. Also, a reset to one side of the DMA link affects the other side if messages were in-flight. This can create a negative experience for a user of the system if the operation and/or functionality of the system are noticeably impaired.

SUMMARY

Systems, apparatuses, and methods for error detection and recovery when streaming data are contemplated. In one embodiment, a system includes one or more companion direct memory access (DMA) subsystems for transferring data between components. When an error is detected for a component of the companion DMA subsystem(s), the operations performed by the other components need to gracefully adapt to this error so that operations face only a minimal disruption. For example, in one scenario, while one or more consumers are still consuming a first frame, a companion router may receive an indication of an error for a second frame. In response to receiving the indication, the companion router sends a router frame abort message to a route manager. In response to receiving the router frame abort message, the route manager waits until the consumer(s) are consuming the second frame before sending them a frame abort message. The consumer(s) flush their pipeline and transition to an idle state waiting for a third frame in response to receiving the frame abort message.

In another embodiment, a producer detects an error during the transfer of a frame to a consumer. In response to detecting the error, the producer continues to generate dummy data and dummy credits and send the dummy data and credits to the consumer to allow the consumer to finish the frame without generating an error signal. The consumer drains the credits from a common buffer until reaching the end of the frame. Both the producer and the consumer proceed on to the next frame without resetting. When the consumer detects an error during the transfer of a given frame, the consumer drains credits from the common buffer allowing the producer to finish sending the given frame without generating an error signal.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
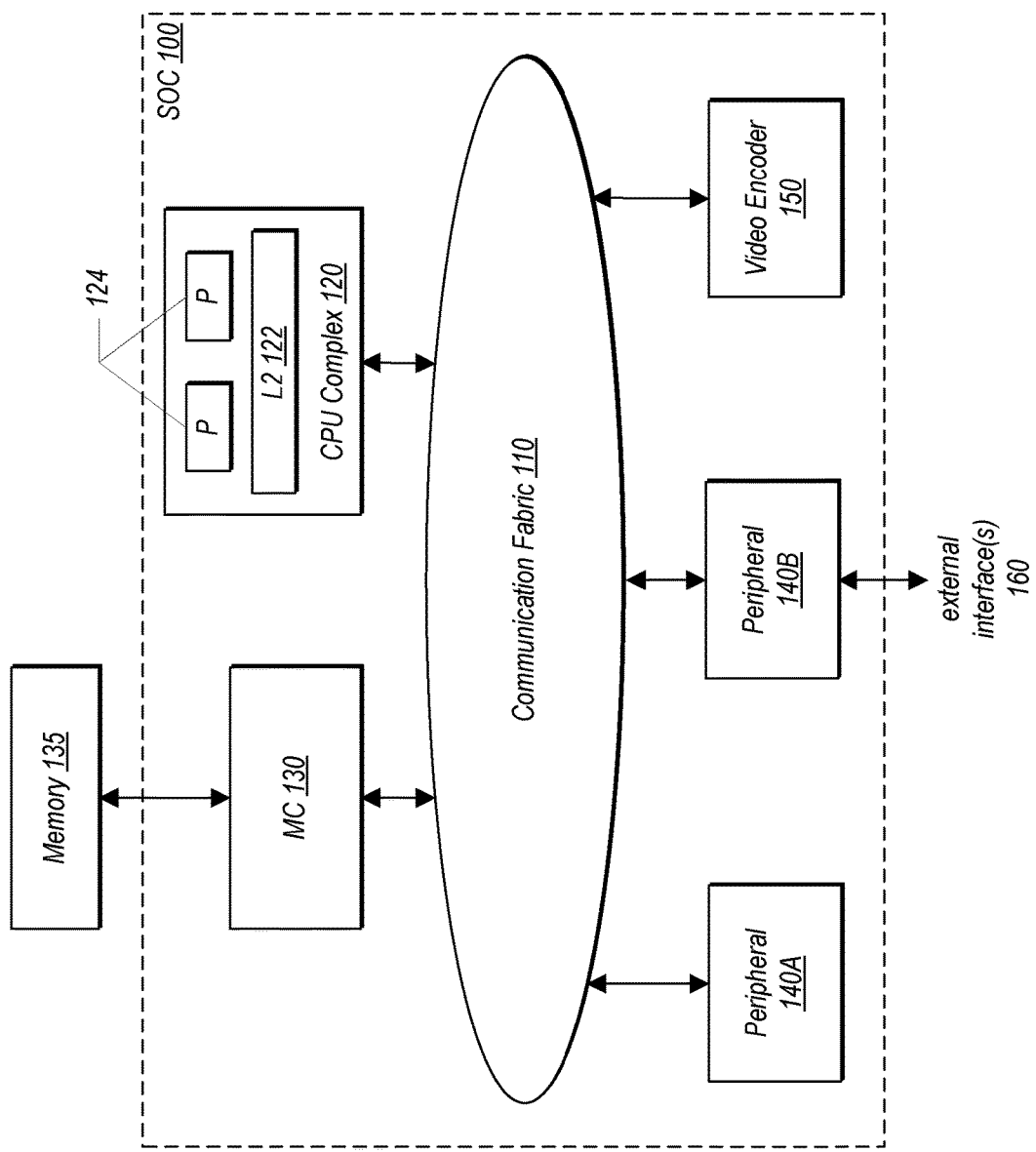
FIG. 1 is a generalized block diagram of one embodiment of a SOC.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring now to FIG. 1, a block diagram of one embodiment of a system-on-a-chip (SOC) 100 is shown. SOC 100 is shown coupled to a memory 135. As implied by the name, the components of the SOC 100 may be integrated onto a single semiconductor substrate as an integrated circuit "chip". In some embodiments, the components may be implemented on two or more discrete chips in a system. However, the SOC 100 will be used as an example herein. In the illustrated embodiment, the components of the SOC 100 include a central processing unit (CPU) complex 120, on-chip peripheral components 140A-140B (more briefly, "peripherals"), a memory controller (MC) 130, a video encoder 150 (which may itself be considered a peripheral component), and a communication fabric 110. The components 120, 130, 140A-140B, and 150 may all be coupled to the communication fabric 110. The memory controller 130 may be coupled to the memory 135 during use, and peripheral 140B may be coupled to an external interface 160 during use. In the illustrated embodiment, the CPU complex 120 includes one or more processors (P) 124 and a level two (L2) cache 122.

The peripherals 140A-140B may be any set of additional hardware functionality included in the SOC 100. For example, the peripherals 140A-140B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 160 external to the SOC 100 (e.g. the peripheral 140B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

In one embodiment, SOC 100 may include at least one instance of a video encoder 150 component. Video encoder 150 may be an H.264 video encoder apparatus that may be configured to convert input video frames from an input format into H.264/Advanced Video Coding (AVC) format as described in the H.264/AVC standard. In one embodiment, SOC 100 includes CPU complex 120. The CPU complex 120 may include one or more CPU processors 124 that serve as the CPU of the SOC 100. The CPU of the system includes the processor(s) that execute the main control software of the system, such as an operating system. Generally, software executed by the CPU during use may control the other components of the system to realize the desired functionality of the system. The processors 124 may also execute other software, such as application programs. The application programs may provide user functionality, and may rely on the operating system for lower level device control. Accordingly, the processors 124 may also be referred to as application processors.

The CPU complex 120 may further include other hardware such as the L2 cache 122 and/or an interface to the other components of the system (e.g., an interface to the communication fabric 110). Generally, a processor may include any circuitry and/or microcode configured to execute instructions defined in an instruction set architecture implemented by the processor. The instructions and data operated on by the processors in response to executing the instructions may generally be stored in the memory 135, although certain instructions may be defined for direct processor access to peripherals as well. Processors may encompass processor cores implemented on an integrated circuit with other components as a system on a chip or other levels of integration. Processors may further encompass discrete microprocessors, processor cores, and/or microprocessors integrated into multichip module implementations, processors implemented as multiple integrated circuits, and so on.

The memory controller 130 may generally include the circuitry for receiving memory operations from the other components of the SOC 100 and for accessing the memory 135 to complete the memory operations. The memory controller 130 may be configured to access any type of memory 135. For example, the memory 135 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 130 may include queues for memory operations, for ordering (and potentially reordering) the operations and presenting the operations to the memory 135. The memory controller 130 may further include data buffers to store write data awaiting write to memory and read data awaiting return to the source of the memory operation.

The communication fabric 110 may be any communication interconnect and protocol for communicating among the components of the SOC 100. The communication fabric 110 may be bus-based, including shared bus configurations, cross bar configurations, and hierarchical buses with bridges. The communication fabric 110 may also be packet-based, and may be hierarchical with bridges, cross bar, point-to-point, or other interconnects. It is noted that the number of components of the SOC 100 (and the number of subcomponents for those shown in FIG. 1, such as within the CPU complex 120) may vary from embodiment to embodiment. There may be more or fewer of each component/subcomponent than the number shown in FIG. 1.

Figure 2:
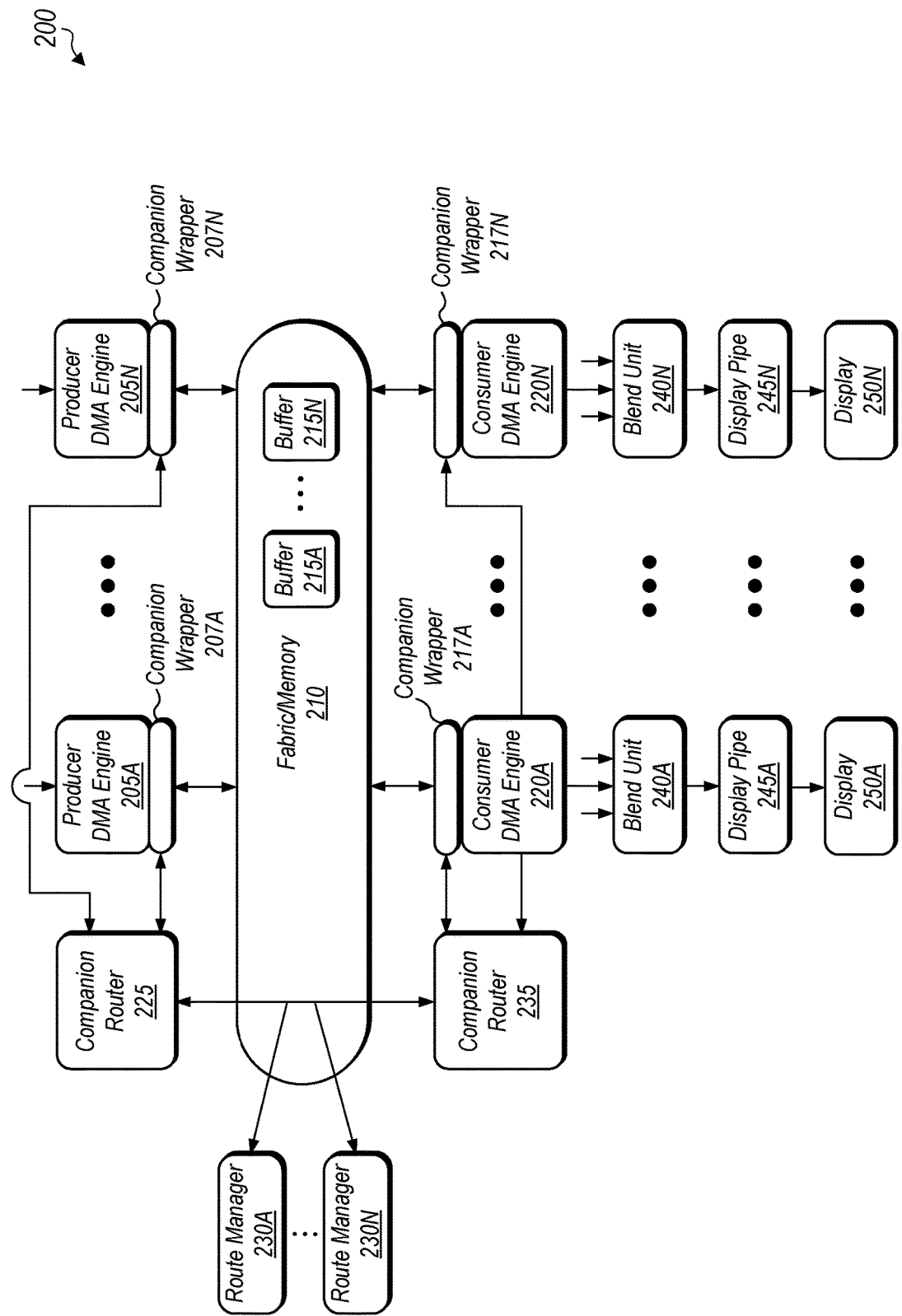
FIG. 2 is a generalized block diagram illustrating one embodiment of a computing system.

Turning to FIG. 2, an embodiment of a block diagram of a computing system 200 is illustrated. In the illustrated embodiment, producer DMA engines 205A-N are coupled to consumer DMA engines 220A-N via fabric and memory subsystem 210. Producer DMA engines 205A-N are representative of any number and type of producer DMA engines that are writing data to buffers in memory. Similarly, consumer DMA engines 220A-N are representative of any number and type of consumer DMA engines that are reading data from buffers in memory. The type of data being produced and consumed can vary according to the embodiment. In one embodiment, the data being produced and consumed includes pixel data which is intended to be displayed on displays 250A-N which are representative of any number of displays.

In one embodiment, each producer DMA engine 205A-N includes or is coupled to a corresponding companion wrapper 207A-N which manages the flow control of data and credits via fabric 210. As used herein, the term "companion wrapper" is defined as a circuit which manages the transfer of data by generating write or read requests which are sent to a buffer and by managing the flow control between producer(s) and consumer(s) which are operating in frame companion mode using local and remote pointers. Companion wrappers 207A-N manage the transfer of data to buffers 215A-N via credits, and companion wrappers 207A-N communicate to each other via companion router 225. Companion router 225 communicates with companion router 235 which is coupled to companion wrappers 217A-N. Companion routers 225 and 235 are managed by route managers 230A-N which are representative of any number of route managers. As used herein, the term "companion router" is defined as a circuit, with accompanying routing table, which exchanges flow control information and pointer updates with remote routers for DMA engines which are operating in frame companion mode. The companion wrappers manage the local and remote pointers used for flow control while the companion routers route pointer updates and frame completion messages to remote peers and the associated route manager.

In one embodiment, each DMA engine 205A-N and 220A-N is capable of operating in frame companion mode with one or more other DMA engines (not shown). As used herein, "frame companion mode" is defined as an operating mode in which the producer and consumer communicate the state of a shared circular buffer between each other so as to implement flow control. The state of the shared circular buffer may be captured by the values of a write pointer and a read pointer, and by the locations of the write pointer and the read pointer in relation to each other. In one embodiment, the shared circular buffer is smaller than a full frame being transferred between the producer and the consumer. Frame companion mode supports the ability of the consumer to know when a credits worth of data has been produced, and frame companion mode supports the ability for the producer to be back-pressured when there is not enough space available in the buffer. Additionally, frame companion mode supports the ability of the consumer to read a region of data in random order and then increment the read pointer if the data associated with skipped over write credits is no longer needed. This feature enables the support of a warper read DMA engine that reads tiles according to a configurable mesh.

In general, producer DMA engines 205A-N generate sub-frames or full frames and transfer these sub-frames or full frames to corresponding buffers 215A-N. The flow control of data to buffers 215A-N is managed by companion wrappers 207A-N. Consumer DMA engines 220A-N consume the data from buffers 215A-N and forward the data to blend units 240A-N. Each blend unit 240A-N receives inputs from any number of consumer DMA engines 220A-N and from any number of other components. Each blend unit 240A-N feeds pixel data to a corresponding display pipe 245A-N which drives the pixel data to a corresponding display 250A-N.

The various components of system 200 support companion DMA operation, with companion DMA operation enabling multiple producers and consumers to collaborate and share data in a relatively seamless fashion. Based on the companion DMA functionality, a consumer DMA engine chases a producer DMA engine with relatively minimal latency and memory buffer footprint. The producer and consumer DMA engines exchange read and write pointers to communicate the data availability for reads and space availability for writes. The producer and consumer DMA engines advance in lock-step with bursts limited by buffer size.

When the components of computing system 200 are performing in their normal capacity, the functioning of system 200 works in a predictable and efficient manner. However, as computing system 200 can be employed in a variety of different scenarios and/or with a variety of different software applications, from time to time, one or more components of system 200 will encounter or produce an error. For example, when one side of the companion DMA link crashes or hangs, the other side is unable to make forward progress. A reset to one side of the companion DMA link affects the other side if messages are in-flight.

When these or other types of malfunctions occur, it is desired for system 200 to adapt in a graceful manner to avoid causing a noticeable or lengthy disturbance to the user experience. For example, requiring a system reboot or software fix for every situation would be a cumbersome and time-consuming solution. Rather than resorting to a reboot or software fix in each case, other techniques can be employed on a case-by-case basis. For example, in one embodiment, when one stream producer encounters a problem, the consumer recovers by switching to an alternative stream producer. Various other techniques may also be used to allow system 200 to adapt to the failure or malfunctioning (temporary or otherwise) of any of the components therein. These other techniques are described throughout the remainder of this disclosure herein.

Figure 3:
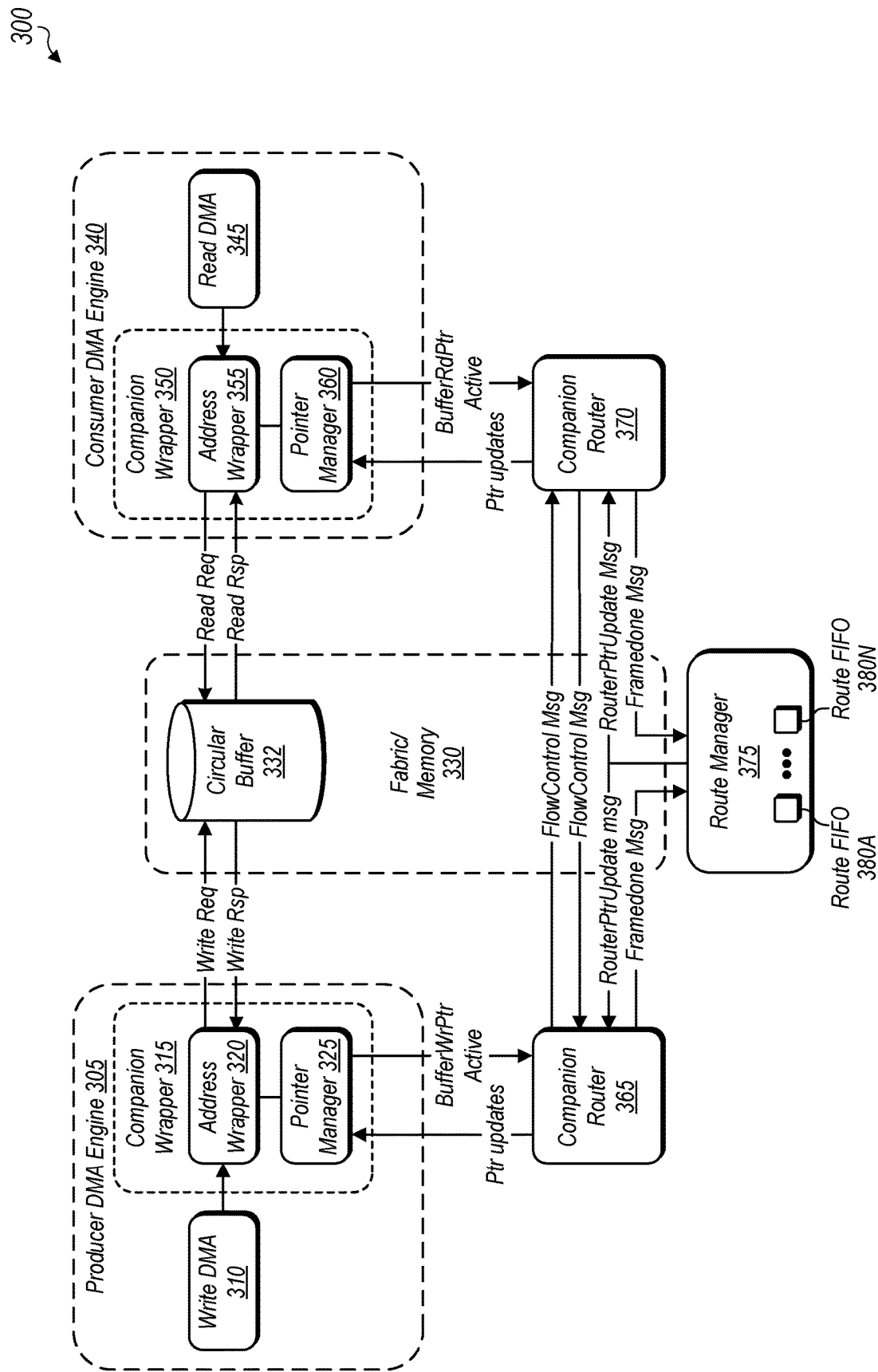
FIG. 3 is a block diagram of one embodiment of a remote companion DMA system.

Referring now to FIG. 3, a block diagram of one embodiment of a remote companion DMA system 300 is shown. The remote companion DMA system 300 illustrates the connections and components of a system where the producer DMA engine 305 and the consumer DMA engine 340 communicate remotely. This companion DMA system 300 may be referred to as a "remote" system since the producer DMA engine 305 does not have a direct connection with the consumer DMA engine 340. It is noted that companion DMA system 300 is one example of a remote companion DMA system in accordance with one embodiment. In other embodiments, other types of remote companion DMA systems with other types of components, other connections, and other suitable structures may be employed.

In one embodiment, pointers are exchanged between the DMA engines 305 and 340 using fabric write requests that are routed between the DMA engines. These pointer exchanges result in virtualizing the wires between the producer and consumer engines. Companion routers 365 and 370 are responsible for routing of flow control information to the DMA engines 305 and 340. In one embodiment, companion routers 365 and 370 route the flow control pointers between the producer and consumer DMA engines using information stored in a router table entry. Companion routers 365 and 370 are also responsible for handling the multi-producer merge and multi-consumer broadcast functionality in systems with multiple producers and/or multiple consumers. For example, in one embodiment, a companion router merges updates from a plurality of producer DMA engines together into a single, updated write pointer. In another embodiment, a companion router merges updates from a plurality of consumer DMA engines together into a single, updated read pointer.

In one implementation, companion router 365 includes control logic and a routing table of entries for producer DMA engine 305. Similarly, companion router 370 includes control logic and a routing table of entries for consumer DMA engine 340. The routing table in each router is used by the router to exchange pointer updates with remote routers.

In one implementation, route manager 375 manages the initialization and updating of the routing tables in the local routers 365 and 370. As used herein, the term "route manager" is defined as a control unit (implemented using any suitable combination of hardware and/or program instructions) which manages the route FIFOs 380A-N and the initialization of the routes in the routers. There can be more than one route manager in the system, and these route managers can manage the routes for any companion routers in the system. Route FIFOs 380A-N are representative of any number of route FIFOs managed by route manager 375. As used herein, the term "route FIFO" is defined as a FIFO queue of route descriptors that specify a serial sequence of frames in a stream. In some embodiments, route manager 375 is over-provisioned with route FIFOs 380A-N in case one of the other subsystems with a route FIFO is powered down. It is noted that the terms "route FIFO" and "route descriptor queue" may be used interchangeably herein.

Software executing on a processor (e.g., processors 124 of FIG. 1) schedules frames by pushing route descriptors into the appropriate route FIFOs of the route manager 375. As used herein, the term "route descriptor" is defined as a field that specifies how to route flow control information between the producer and the consumer. Each companion DMA subsystem has a producer route descriptor in each producer DMA and a consumer route descriptor in each consumer DMA. At a minimum, there is one producer route descriptor and one consumer route descriptor per companion DMA subsystem, but in general there can be any number of producer route descriptors and consumer route descriptors. Also, while there is a 1:1 mapping from companion wrapper to DMA unit, there can be multiple companion wrappers for each companion router.

In one embodiment, the route manager 375 pops the route descriptors off the route FIFOs and initializes the route entries in the corresponding routers 365 and 370. As used herein, the term "route entry" is defined as the active state of the flow control information in flight as well as a copy of the route descriptor. It is noted that the terms "route entry" and "route table entry" may be used interchangeably herein. The route manager 375 also receives frame done messages from the routers 365 and 370. The frame done messages are used for scheduling the descriptors of the next frame as well as for initializing the pointers in the route entries to handle frame overlap when the producer(s) have moved onto the next frame while consumer(s) are finishing up the current frame.

Producer DMA engine 305 includes at least write DMA unit 310 and companion wrapper 315. As used herein, a "producer DMA engine" is defined as a write DMA channel that is writing data to a buffer in memory. A "producer DMA engine" may also be referred to herein as a "producer" for short. Companion wrapper 315 includes address wrapper 320 and pointer manager 325. Address wrapper 320 manages the data writes to circular buffer 332 as well as the address wrap around case for circular buffer 332. Address wrapper 320 generates write requests (i.e., data writes) which are sent to circular buffer 332 within fabric and memory subsystem 330, and address wrapper 320 receives responses to the write requests from circular buffer 332. Pointer manager 325 manages the flow control between producer DMA engine 305 and consumer DMA engine 320 via the local and remote pointers.

Consumer DMA engine 340 includes at least read DMA unit 345 and companion wrapper 350 which includes address wrapper 355 and pointer manager 360. As used herein, a "consumer DMA engine" is defined as a read DMA channel that is reading data from a buffer in memory. A "consumer DMA engine" may also be referred to herein as a "consumer" for short. Companion wrapper 350 manages the flow control for the DMA channel. When write DMA engine 310 finishes writing a data chunk to buffer 332, pointer manager 325 sends a buffer write pointer update to companion router 365. This update flows through companion router 370 to pointer manager 360. The buffer write pointer update indicates that a data credit has been committed to buffer 332 and is ready to be consumed. The size of the data chunk which corresponds to a data credit may vary according to the embodiment. In one embodiment, the size of the data chunk is measured in terms of bytes of data. In another embodiment, the size of the data chunk is measured in terms of lines of a frame. In a further embodiment, the size of the data chunk is measured in terms of tiles or blocks of a frame.

When read DMA unit 345 consumes the data credit, pointer manager 360 sends a buffer read pointer update to companion router 370 indicating that the data credit has been consumed and space has been freed up in buffer 332 to be reused by DMA producer engine 305. The buffer read pointer update continues on through companion router 365 to pointer manager 325.

In one embodiment, buffer 332 is a circular buffer. In other embodiments, buffer 332 is other types of buffers. It is noted that buffer 332 supports random access by the producer and consumer to the chunks of data stored in buffer 332. This allows the order of data production and consumption to be random. On the other hand, pointer updates are sequential but can often skip ahead by multiple increments. In one embodiment, buffer 332 is treated as FIFO where a producer pushes credits worth of data into the buffer with an incrementing write pointer. The consumer consumes a credits worth of data from the buffer with an incrementing read pointer. The pointer addresses wrap with the size of the circular buffer. The pointer can increment by either an actual data access (read/write) or the pointer can increment when a credit is skipped over. As used herein, the term "credit" is defined as a unit of flow control between the producer and the consumer. Depending on the embodiment, a credit can be measured in terms of a number of bytes of data, number of lines of uncompressed frame data, a strip of frame data, a tile row for tile data such as compressed data, or otherwise. The circular buffer read and write pointers used for flow control are adjusted in units of credits. The parameter "SA-credits" measures the space available in the circular buffer in units of credits, and the parameter "DA-credits" measures the data available in the circular buffer in units of credits.

In one embodiment, the buffer write pointer points to the next location in the circular buffer where the producer will produce a credits worth of data. Production of data is either writing the data or not writing the data in the case of skipping a credit. In one embodiment, the buffer read pointer is the next location in the circular buffer where the consumer will consume a credits worth of data. Consumption of data signifies that the consumer is done with the data regardless of whether the consumer actually read the data or merely skipped over the data.

Figure 4:
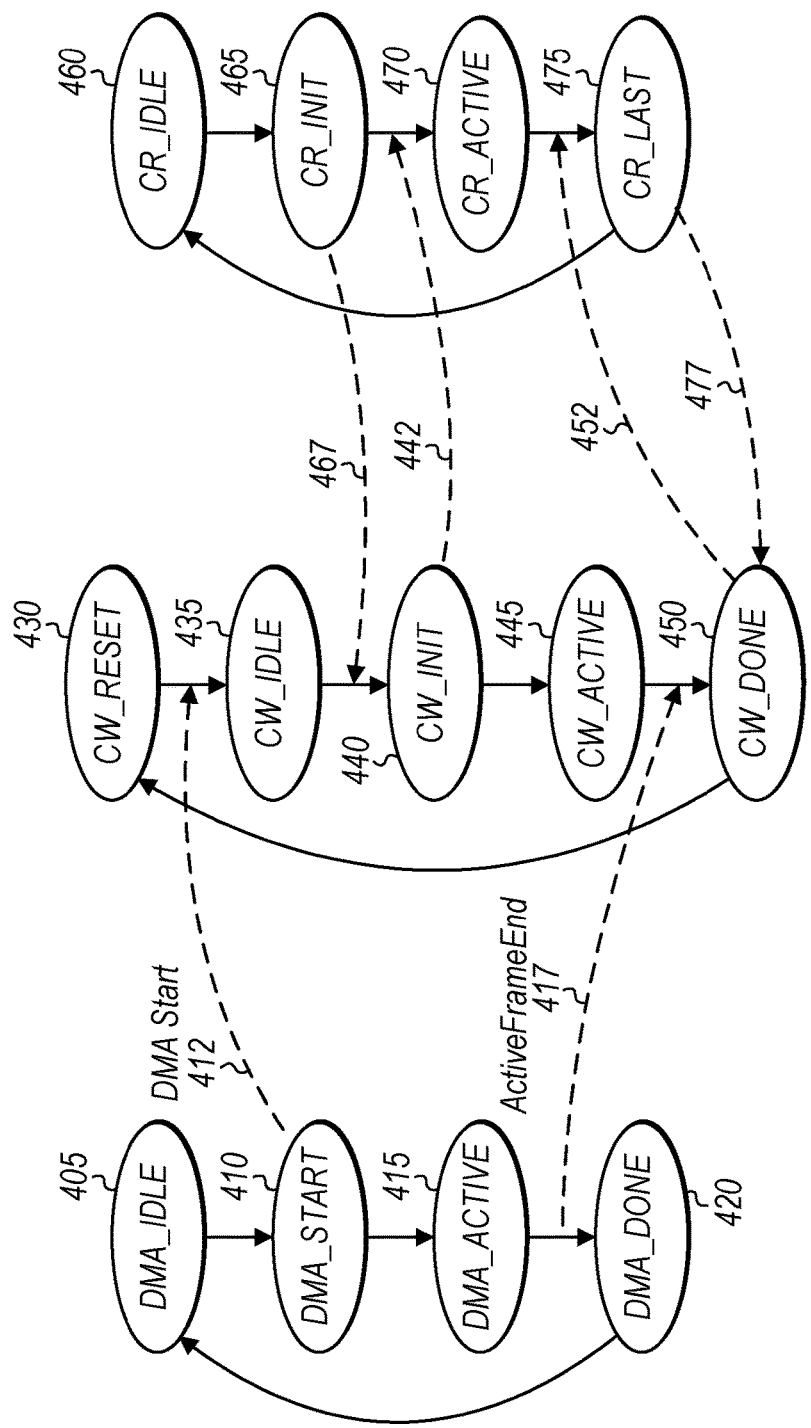
FIG. 4 is a state machine diagram for operating a companion DMA system in accordance with one embodiment.

Turning now to FIG. 4, one embodiment of a state machine diagram 400 for operating a companion DMA system is shown. Three separate state machines are shown in FIG. 4 for a DMA engine state machine (left-side of FIG. 4), companion wrapper state machine (middle of FIG. 4), and companion router state machine (right-side of FIG. 4). In one embodiment, the DMA state machine defines the operation of producer DMA engines 205A-N and consumer DMA engines 220A-N of FIG. 2 and producer DMA engine 305 and consumer DMA engine 340 of FIG. 3. In this embodiment, the companion wrapper state machine applies to the operation of companion wrappers 207A-N and 217A-N of FIG. 2 and companion wrappers 315 and 350 of FIG. 3. Also, in one embodiment, the companion router state machine defines the operation of companion routers 225 and 235 of FIG. 2 and companion routers 365 and 370 of FIG. 3.

The states 405, 410, 415, and 420 are shown on the left-side of FIG. 4 for a DMA engine state machine in accordance with one embodiment. For example, state 405 is the DMA idle state, while state 410 is the DMA start state. State 415 is the DMA active state and state 420 is the DMA done state, at which point the state machine returns to the idle state 405. The middle diagram of FIG. 4 shows an example of the companion wrapper state machine with reset state 430, idle state 435, initialization state 440, active state 445, and done state 450. The right-most diagram of FIG. 4 depicts the companion router state machine with idle state 460, initialization state 465, active state 470, and last state 475.

When a DMA engine is in the DMA start state 410, this triggers the corresponding companion wrapper to go from reset state 430 to idle state 435 as shown with arrow 412. Also, when an active frame end signal 417 is generated as the DMA engine transitions from the active state 415 to the done state 420, this causes the corresponding companion wrapper to transition from the active state 445 to the done state 450.

When the companion router is in the initialization state 465, this triggers the corresponding companion wrappers to transition from the idle state 435 to the initialization state 440 as depicted by arrow 467. Also, arrow 442 shows the triggering of the companion router transitioning to the active state 470 while the companion wrappers are in the initialization state 440. When the companion wrappers reach the done state 450, this causes the companion router to go from active state 470 to the last state 475 as shown by arrow 452. Then, signal 477 is generated and sent from the companion router to the companion wrappers when the companion router has reached last state 475.

In one embodiment, when an error occurs for a companion DMA subsystem component, a router frame abort signal is asserted in response to the error being detected. In response to the router frame abort signal being asserted, the companion router generates an error interrupt for software. Also, the companion router sends a router frame abort message to the route manager which relays the message to all participants in the frame. In one embodiment, the route manager waits until the pipelined consumers finish the previous frame and are actively processing the defective frame before relaying the message.

In one embodiment, in response to receiving the router frame abort message, each companion wrapper sets its local buffer pointer to zero and each companion router sets its remote buffer pointer to zero. Both the companion wrapper and companion router go through the done state 450 and last state 475, respectively, and enter the reset state 430 and idle state 460, respectively, to be ready for the next frame from the route manager. The companion router does not send any flow control messages and the companion router ignores flow control messages after the router frame abort message is received. The display pipelines drop incoming data which is received and reset or flush the pipelines and DMA configurations in response to receiving the router frame abort signal. Also, the display pipelines assert an active frame end signal to the companion wrappers.

Figure 5:
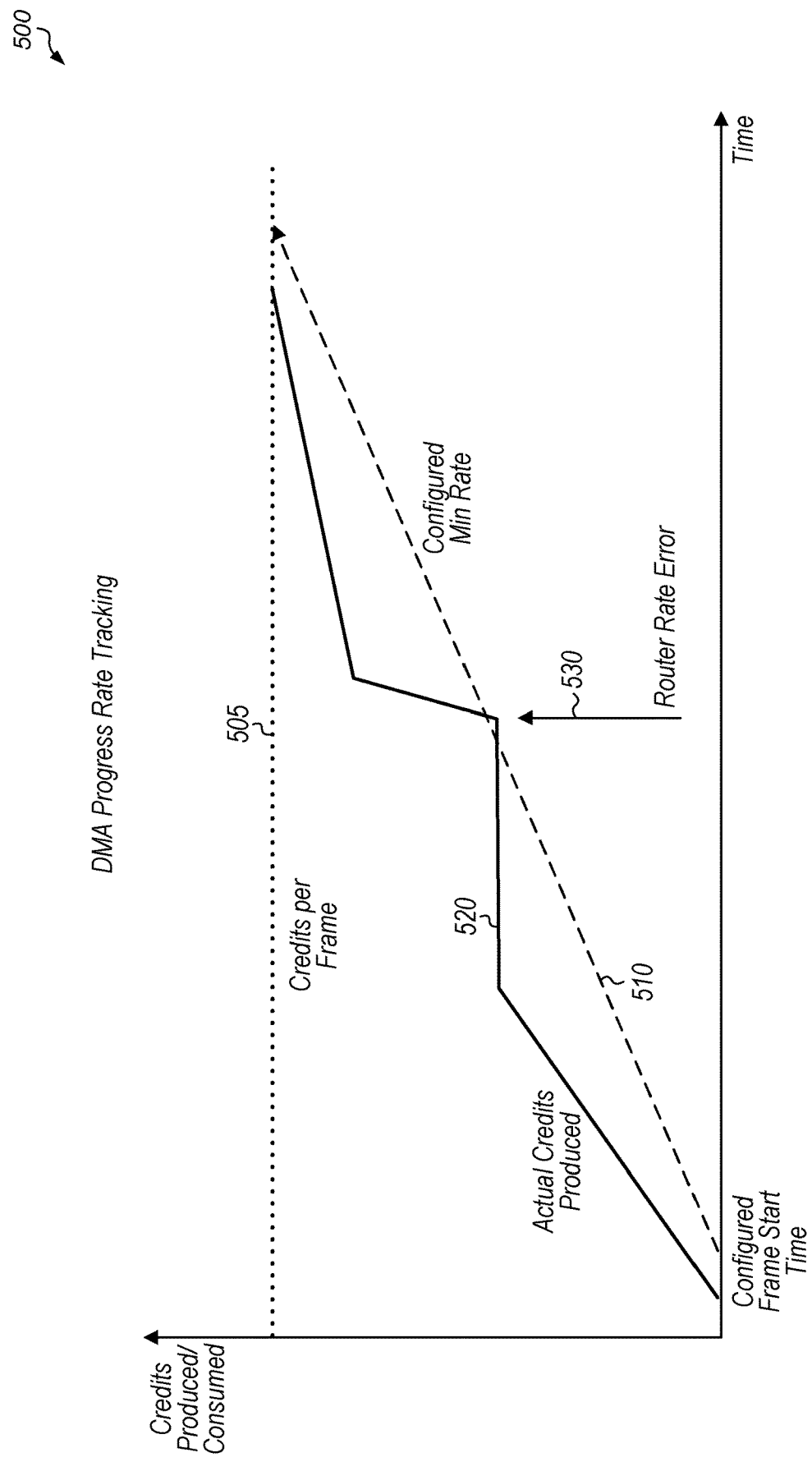
FIG. 5 is a diagram of DMA progress rate tracking in accordance with one embodiment.

Referring now to FIG. 5, a diagram of DMA progress rate tracking in accordance with one embodiment is shown. Diagram 500 is intended to represent an example scenario of DMA progress rate tracking by a producer DMA engine or a consumer DMA engine. Dashed line 510 represents the configured minimum rate at which credits should be produced or consumed by a given producer or consumer, respectively. In one embodiment, dashed line 510 is calculated by calculating the total credits per frame, represented by credits per frame dashed line 505, and then dividing the total credits per frame by the frame duration measured from the start of the frame until the end of the frame.

Solid line 520 represents tracking of the actual credits that are produced or consumed in one example scenario. As long as the amount of actual credits that are produced or consumed stays above configured minimum rate line 510, then the producer or consumer DMA engine is on track to complete its portion of work on time for the current frame. If, as shown at point in time 530, the actual credits produced or consumed dips below configured minimum rate line 510, then this indicates that a router rate error has occurred. In one embodiment, in response to detecting a router rate error, the producer or consumer DMA engine generates an interrupt for software. Also, in one embodiment, a router frame abort signal is generated in response to the actual credits produced or consumed line 520 falling below the minimum progress rate line 510.

Figure 6:
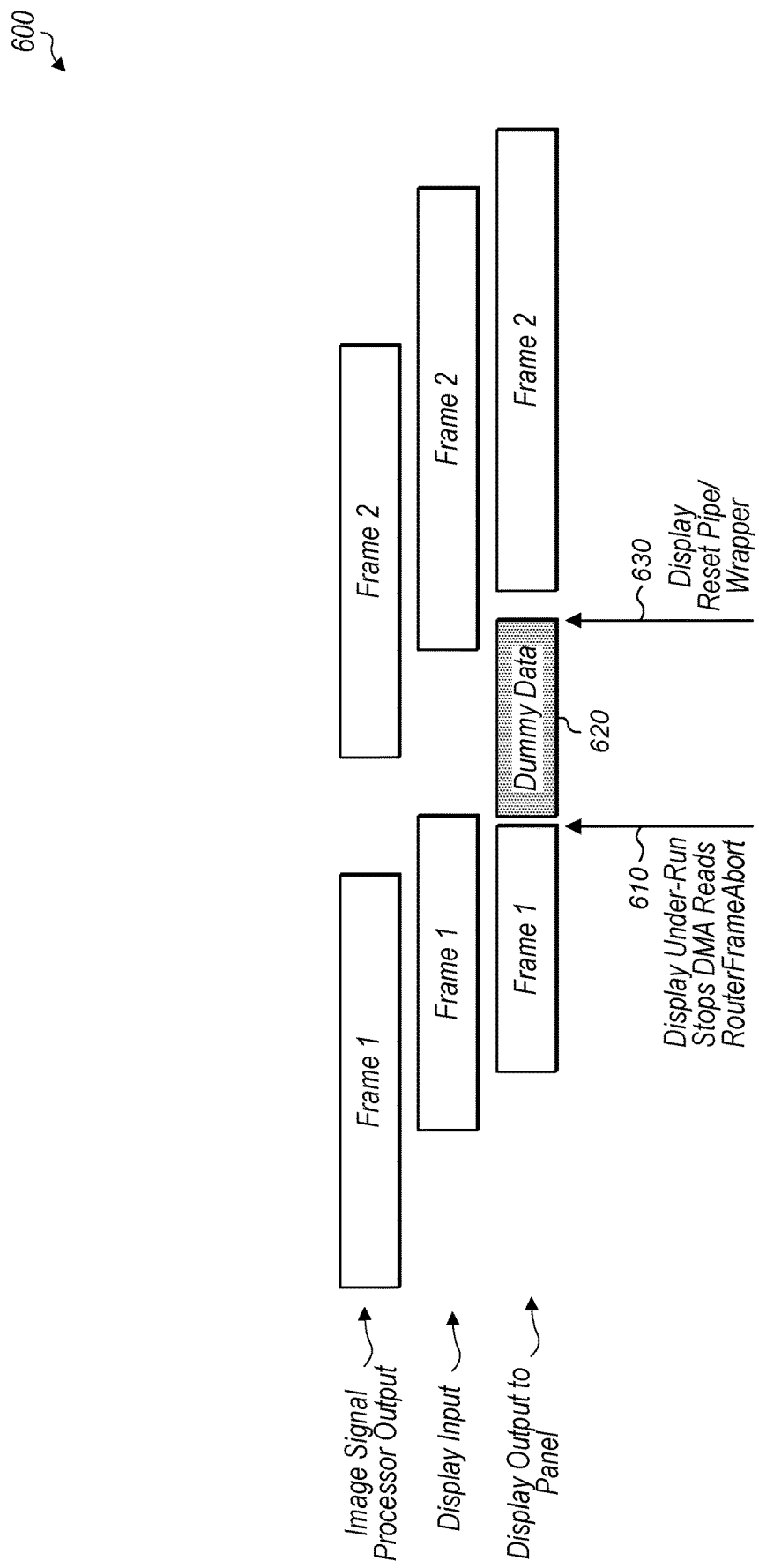
FIG. 6 is a timing diagram of frame transfer between components in accordance with one embodiment.

Turning now to FIG. 6, a timing diagram 600 of frame transfer between components in accordance with one embodiment is shown. The top row of timing diagram 600 depicts the frame timing for frames generated by an image signal processor. In one embodiment, the frames generated by the image signal processor are provided to the input of a display pipeline. The timing of the frames received by the display pipeline is shown in the middle row of timing diagram 600. The bottom row of timing diagram 600 depicts the timing of frames provided by the display pipeline to the display panel.

As can be seen at the point in time represented by arrow 610, a consumer error occurs for the first frame. In this example, the consumer error is a display under-run. However, in other embodiments, other types of consumer errors can occur other than a display under-run. At point in time 610, DMA reads are stopped and a router frame abort signal is generated. The display pipeline generates dummy data 620 to fill in the missing pixels that were not received. At point in time 630, the display pipeline and the companion wrapper are reset prior to commencing processing and transfer of the second frame. It is assumed for the purposes of timing diagram 600 that an under-run does not occur for the second frame. It is noted that in other embodiments, other components different from those shown in FIG. 6 may exhibit similar timing behavior during the transfer of frames.

Figure 7:
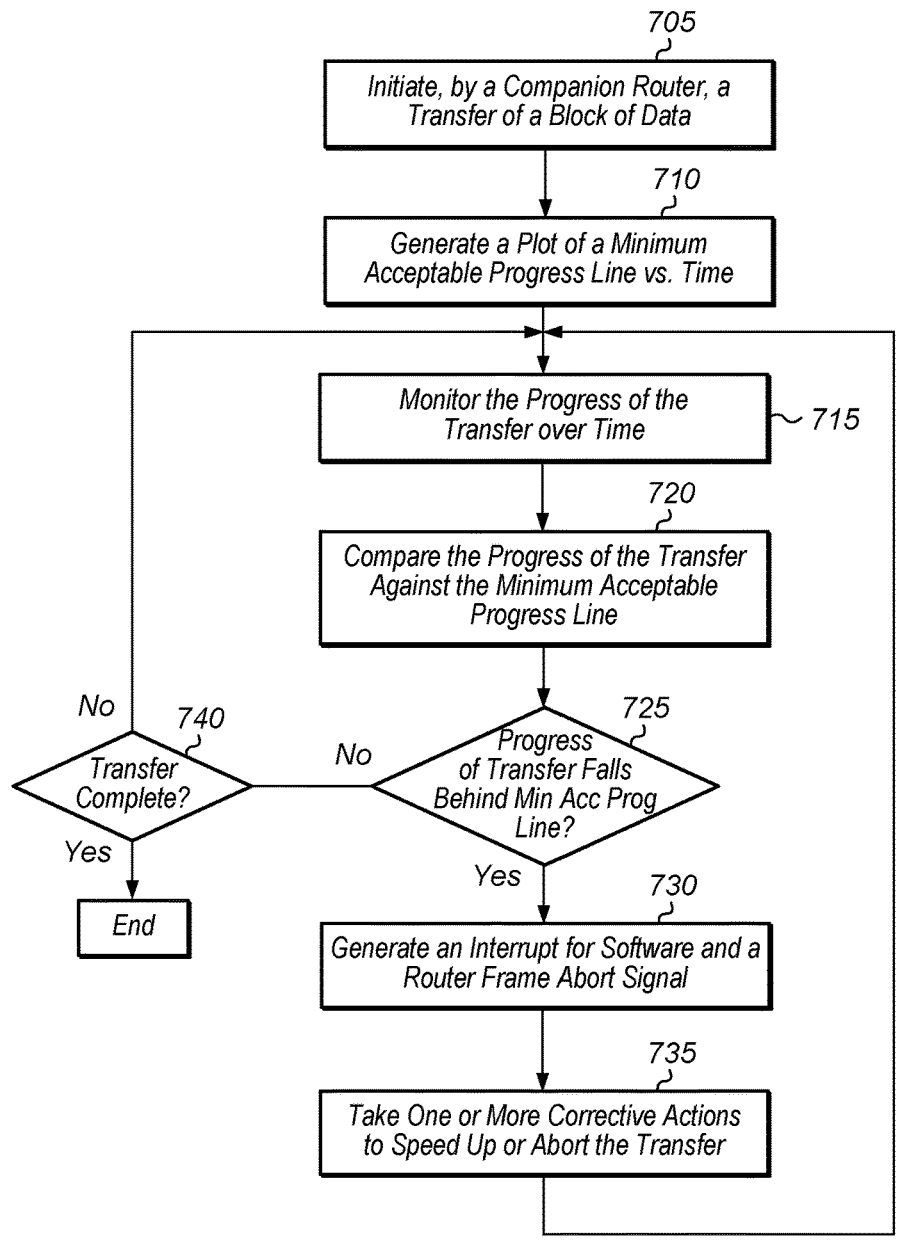
FIG. 7 is a flow diagram of one embodiment of a method for monitoring the progress of a data transfer

Turning now to FIG. 7, a generalized flow diagram of one embodiment of a method 700 for monitoring the progress of a data transfer is shown. For purposes of discussion, the steps in this embodiment (as well as for FIGS. 8-13) are shown in sequential order. However, in other embodiments some steps may occur in a different order than shown, some steps may be performed concurrently, some steps may be combined with other steps, and some steps may be absent. A companion router (e.g., companion router 225 of FIG. 2) initiates a transfer of a block of data (block 705). The content of the block of data may vary according to the embodiment. In one embodiment, the block of data is a video frame, while in other embodiments, the block of data can correspond to other types of data used for other types of applications. Next, the router generates a plot of a minimum acceptable progress line versus time (block 710). In one embodiment, the minimum acceptable progress line is calculated as the time since an expected start multiplied by a rate, where the rate is the expected pace at which portions of data should be transferred. In another embodiment, the rate is the expected pace at which credits should be consumed or produced. The router may generate different linear progress lines that correspond to different types of data being transferred and/or based on different types of deadlines or performance goals. Alternatively, the router may load a previously generated plot in block 710 rather than generating the plot in real-time.

During transfer of the block of data, the router monitors the progress of the transfer over time (block 715). The router compares the progress of the transfer against the minimum acceptable progress line (block 720). If the progress of the transfer falls behind the minimum acceptable progress line (conditional block 725, "yes" leg), then the router generates an interrupt for software and a router frame abort signal (block 730). Then, the system takes one or more corrective actions to speed up or abort the transfer (block 735). After block 735, method 700 returns to block 715. Otherwise, if the progress of the transfer stays ahead of the minimum acceptable progress line (conditional block 725, "no" leg), then the router determines if the transfer is complete (conditional block 740). If the transfer is complete (conditional block 740, "yes" leg), then method 700 ends. Otherwise, if the transfer is not complete (conditional block 740, "no" leg), then method 700 returns to block 715.

Figure 8:
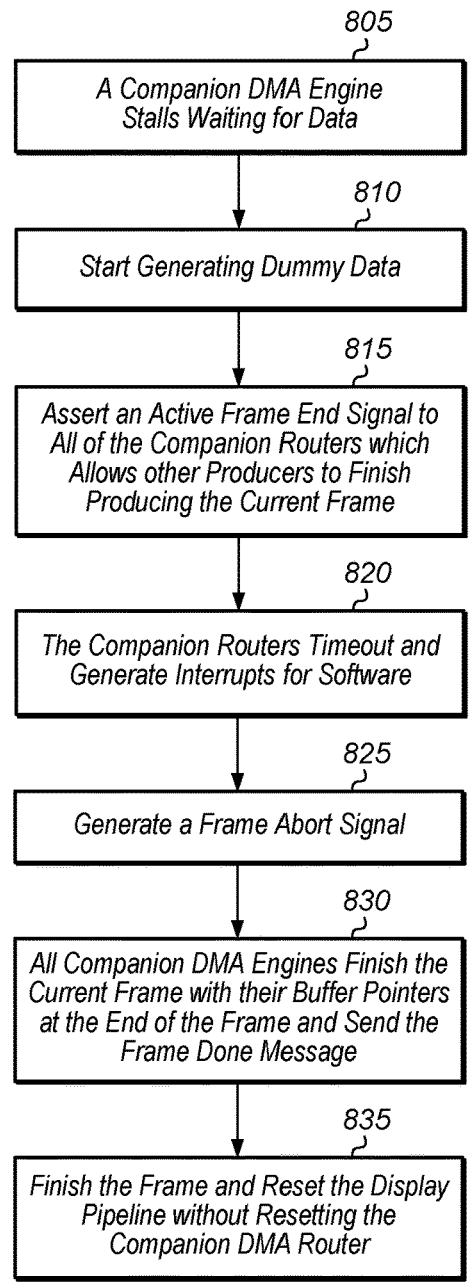
FIG. 8 is a flow diagram of one embodiment of a method for handling a stall of a companion DMA engine.

Turning now to FIG. 8, one embodiment of a method 800 for handling a stall of a companion DMA engine is shown. A companion DMA engine stalls waiting for data (block 805). Depending on the embodiment, any of various types of consumer errors can cause the companion DMA engine stall. In one embodiment, the stall is detected when a display output buffer under-runs (i.e., falls below a threshold). In another embodiment, the stall is detected when a blender under-runs. It is assumed for the purposes of this discussion that the companion DMA engine supplies a display pipeline with data. However, it should be noted that the companion DMA engine can supply other types of data to different types of components in other embodiments.

In response to detecting the stall, the companion DMA engine starts generating dummy data (block 810). In one embodiment, the dummy data is random data. In another embodiment, the dummy data is data that resembles or closely matches data of a previous frame. In a further embodiment, the dummy data is data that is generated to match an expected or predicted portion of the current frame. Any of various predictors may be used to generate the dummy data. Also in response to the stall, an active frame end signal is asserted to all of the companion routers which allows other producers to finish producing the current frame (block 815). The other producers may either stall without generating an error or stall at the point of over-run and then produce dummy data.

Next, the companion routers time-out and generate interrupts for software (block 820). Then, the software generates a frame abort signal (block 825). Also, all companion DMA engines (those aborted and those not aborted) finish the current frame with their buffer pointers at the end of the frame and send the frame done message (block 830). The display pipeline finishes the frame and resets the display pipeline without resetting the companion DMA router (block 835). After block 835, method 800 ends.

Figure 9:
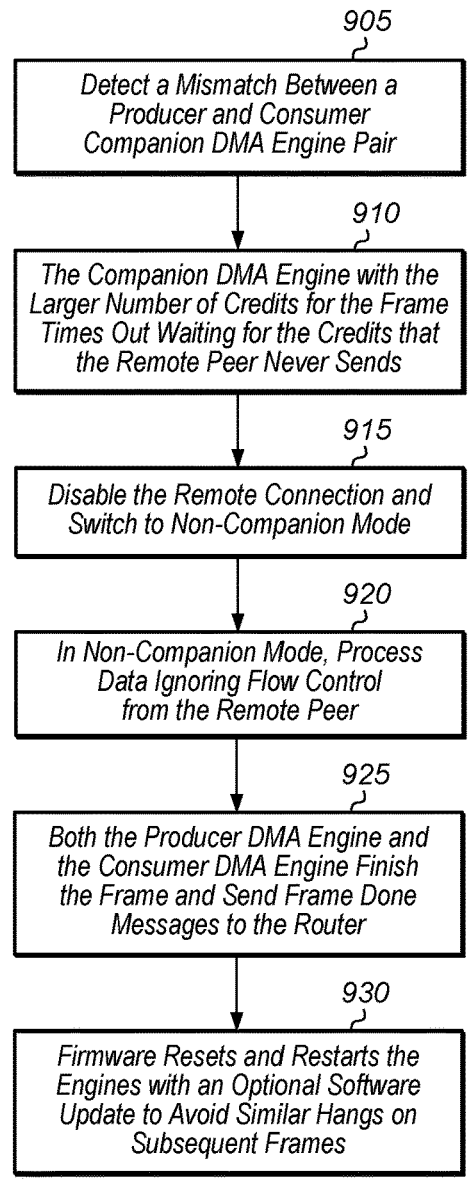
FIG. 9 is a flow diagram of one embodiment of a method for responding to a companion DMA engine mismatch.

Referring now to FIG. 9, one embodiment of a method 900 for responding to a companion DMA engine mismatch is shown. A mismatch between a producer and consumer companion DMA engine pair is detected (block 905). When the mismatch is detected, the companion DMA engine with the larger number of credits for the frame will timeout waiting for the credits that the remote peer never sends (block 910). After the companion DMA engine times out waiting for credits from the remote peer, the companion DMA engine disables the remote connection and switches to non-companion mode (block 915). In non-companion mode, the companion DMA engine processes data ignoring flow control from the remote peer (block 920). Both the producer DMA engine and the consumer DMA engine will finish the frame and send the frame done messages to the router (block 925). Then, the firmware resets and restarts the engines with an optional software update to avoid similar hangs on subsequent frames (block 930). After block 930, method 900 ends.

Figure 10:
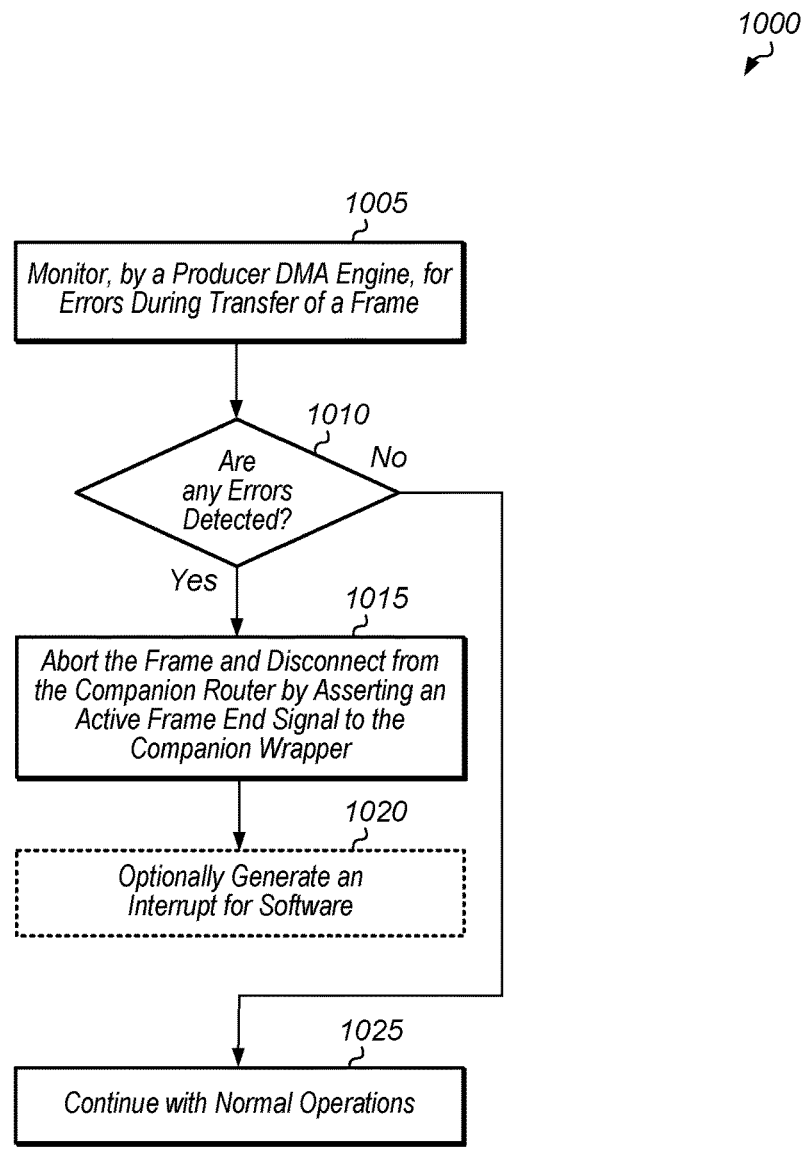
FIG. 10 is a flow diagram of one embodiment of a method for a producer DMA engine to support limited consumer stalls.

Turning now to FIG. 10, one embodiment of a method for a producer DMA engine to support limited consumer stalls is shown. A producer DMA engine monitors for errors during transfer of a frame (block 1005). While method 1000 is described in the context of a frame being transferred, it should be understood that this is merely one possible implementation of method 1000. In other embodiments, the producer DMA engine may transfer other types of datasets besides image or video frames. If an error occurs during transfer of the frame (conditional block 1010, "yes" leg), then the producer DMA engine aborts the frame and disconnects from the companion router by asserting an active frame end signal to the companion wrapper (block 1015). In one embodiment, the error is detected by monitoring internal buffers and detecting an over-run of a buffer. The over-run of the buffer can be detected by the occupancy of the buffer rising above a threshold. In other embodiments, other types of errors can be detected during transfer of the frame. The producer DMA engine also optionally generates an interrupt for software (block 1020). Otherwise, if no errors are detected during transfer of the frame (conditional block 1010, "no" leg), then the producer DMA engine continues with normal operations (block 1025). After blocks 1020 and 1025, method 1000 ends.

Figure 11:
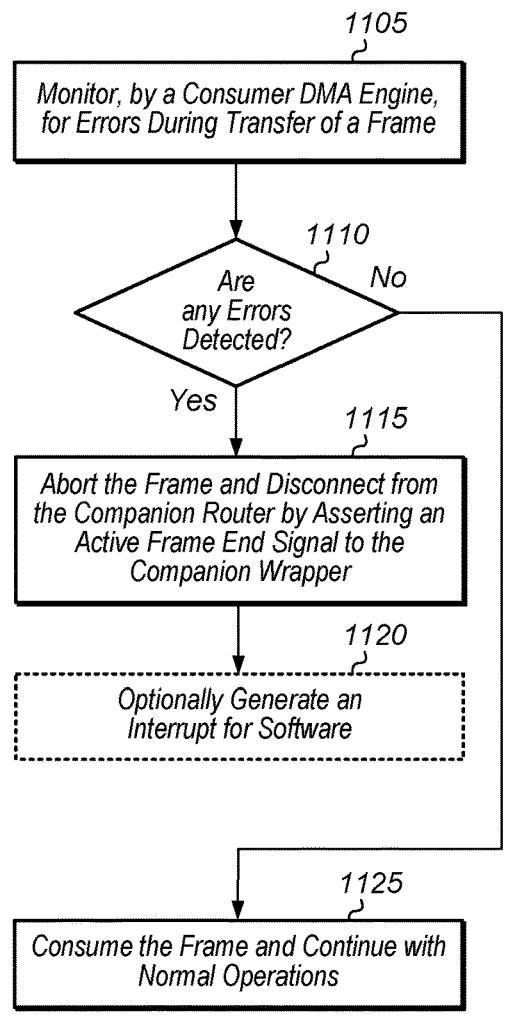
FIG. 11 is a flow diagram of one embodiment of a method for a consumer DMA engine to support limited producer stalls.

Referring now to FIG. 11, one embodiment of a method 1100 for a consumer DMA engine to support limited producer stalls is shown. A consumer DMA engine monitors for errors during transfer of a frame (block 1105). While method 1100 is described in the context of a frame being transferred, it should be understood that this is merely one possible implementation of method 1100. In other embodiments, the consumer DMA engine may consume other types of datasets besides image or video frames. If an error is detected during transfer of the frame (conditional block 1110, "yes" leg), then the consumer DMA engine aborts the frame and disconnects from the companion router by asserting an active frame end signal to the companion wrapper (block 1115). In one embodiment, the error is an under-run on an internal buffer. The under-run can be caused by a display under-run in one scenario. In other embodiments, other errors can be detected. The consumer DMA engine also optionally generates an interrupt to notify software of the frame being aborted (block 1120). Otherwise, if no errors are detected during transfer of the frame (conditional block 1110, "no" leg), then the consumer DMA engine consumes the frame and continues with normal operations (block 1125). After blocks 1120 and 1125, method 1100 ends.

Figure 12:
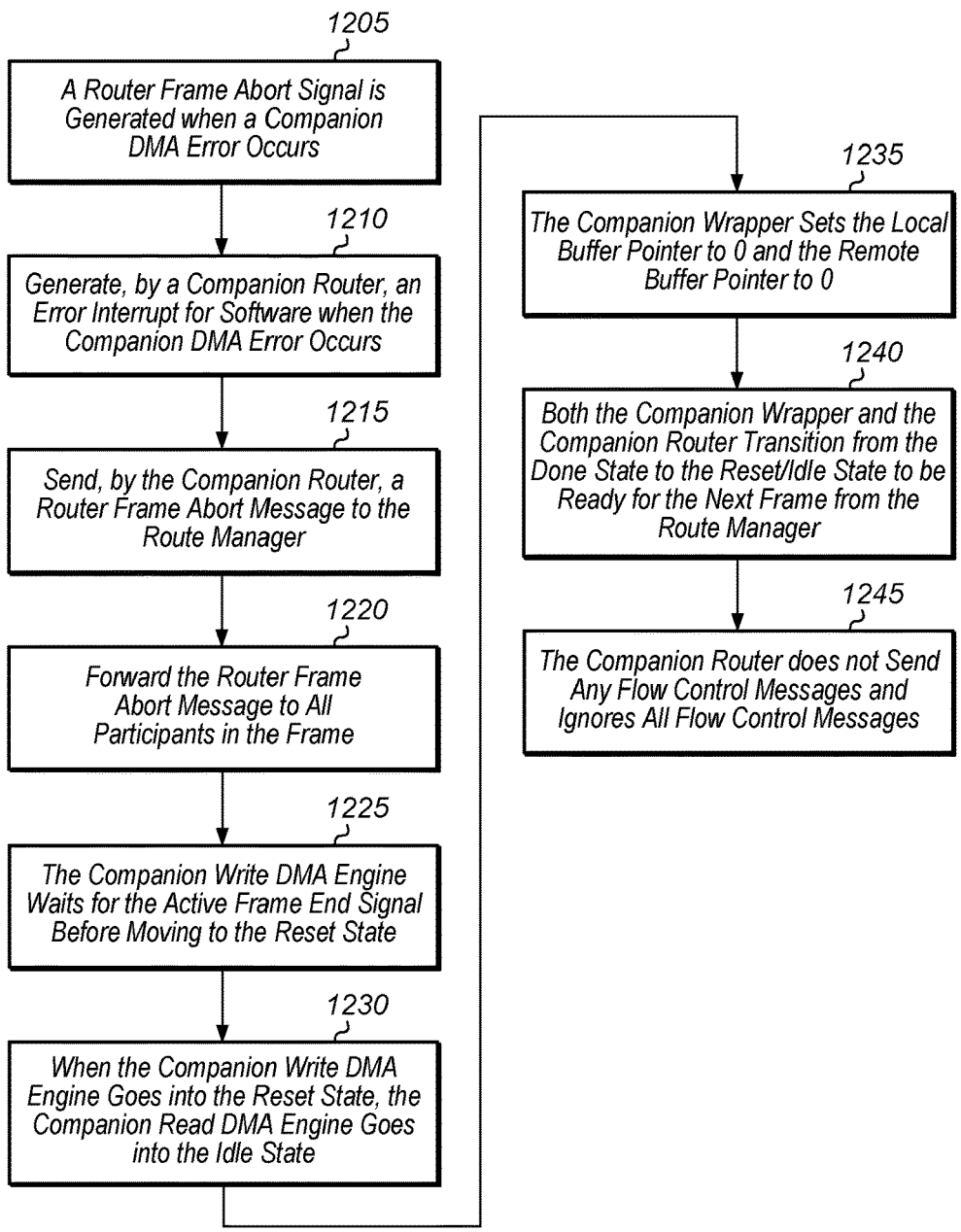
FIG. 12 is a flow diagram of one embodiment of a method for handling a companion DMA error.

Turning now to FIG. 12, one embodiment of a method 1200 for handling a companion DMA error is shown. A router frame abort signal is generated when a companion DMA error occurs (block 1205). A companion router generates an error interrupt for software when a companion DMA error occurs (block 1210). A companion DMA error can be detected in a variety of different ways. For example, in one embodiment, a companion DMA error is detected when the time between a start of entry activation and the first credit consumed or produced (i.e., a pointer update) is greater than a threshold. In another embodiment, a companion DMA error is detected when the time between pointer updates is greater than a threshold. Other examples of errors being detected include, but are not limited to, a timeout detection when the data available credit count remains above a threshold, a DMA progress rate falls below an expected rate, a timeout from the start of route initialization for the first producer until the reception of the last frame done message from the consumers, a display FIFO under-run, a missed frame, a sensor frame timeout, a buffer overflow, or a companion router rate error.

Also in response to the companion DMA error, the companion router sends a router frame abort message to the route manager (block 1215). Next, the route manager forwards the router frame abort message to all participants in the frame (block 1220). In one embodiment, the route manager waits until pipelined consumer DMA engines finish the previous frame and are actively processing the current frame (which has the error) before forwarding the router frame abort message to the consumer DMA engines. The companion write DMA engine waits for the active frame end signal before moving to the reset state (block 1225). When the companion write DMA engine goes into the reset state, the companion read DMA engine goes into the idle state (block 1230). The companion wrapper sets the local buffer pointer to 0 and sets the remote buffer pointer to 0 (block 1235). Both the companion wrapper and the companion router transition from the done state to the reset/idle state to be ready for the next frame from the route manager (block 1240). The companion router does not send any flow control messages and ignores all flow control messages (block 1245). After block 1245, method 1200 ends.

Figure 13:
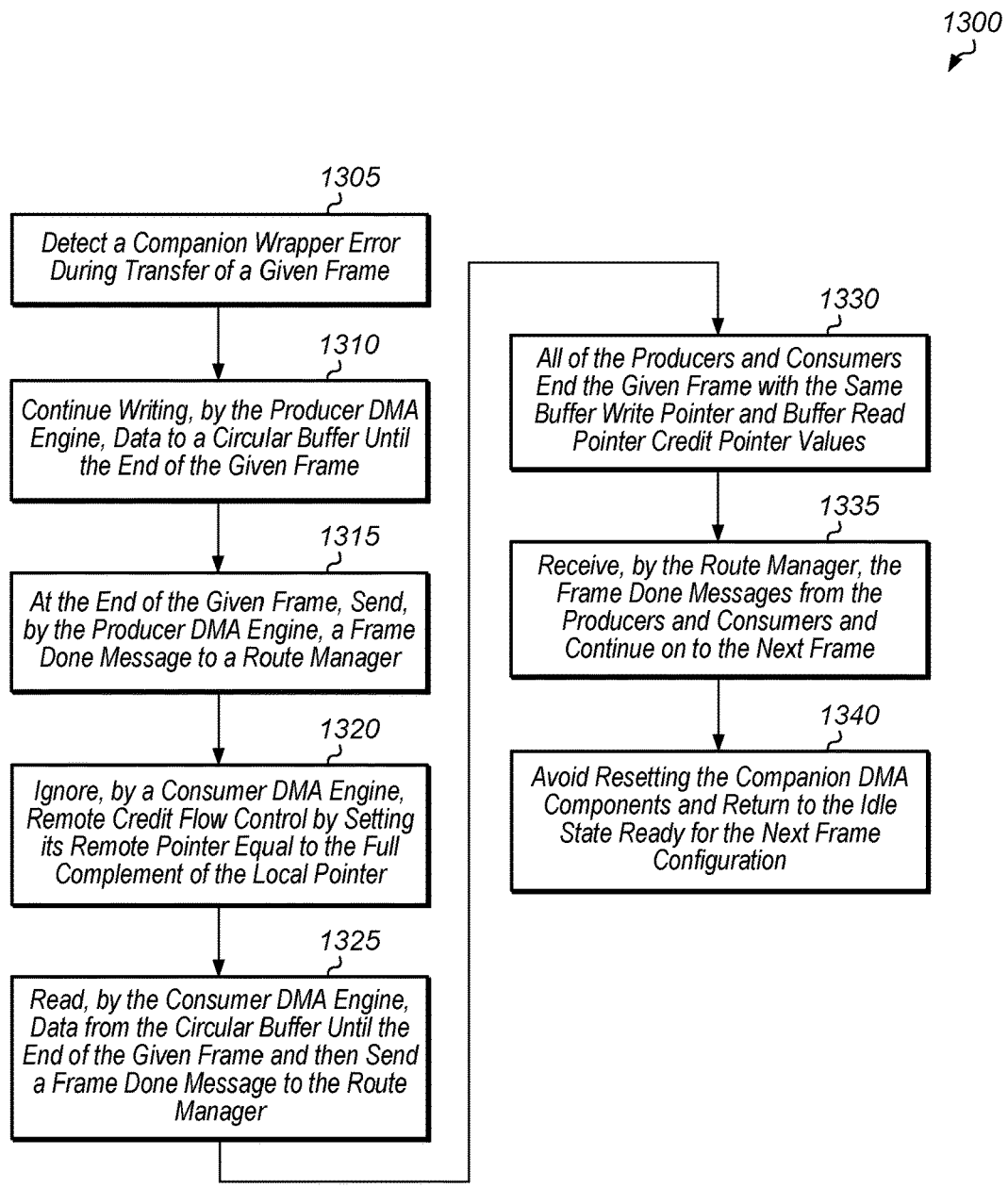
FIG. 13 is a flow diagram of one embodiment of a method for disabling a remote mechanism in response to a companion wrapper error.

Turning now to FIG. 13, one embodiment of a method 1300 for disabling a remote mechanism in response to a companion wrapper error is shown. A companion wrapper error is detected during transfer of a given frame (block 1305). While method 1300 is described in the context of a frame being transferred, it should be understood that this is merely one possible implementation of method 1300. In other embodiments, other types of datasets may be transferred besides image or video frames. In response to detecting the companion wrapper error, a producer DMA engine continues writing data (e.g., dummy data) to a circular buffer until the end of the given frame (block 1310). It is assumed for the purposes of this discussion that only the producer DMA engine has the error. At the end of the given frame, the producer DMA engine sends a frame done message to a route manager (block 1315). A consumer DMA engine ignores remote credit flow control by setting its remote pointer equal to the full complement of the local pointer (block 1320). The consumer DMA engine reads data from the circular buffer until the end of the given frame after which the consumer DMA engine sends a frame done message to the route manager (block 1325). All of the producers and consumers will end the given frame with the same buffer write pointer and buffer read pointer credit pointer values (block 1330). The route manager receives the frame done messages from the producers and consumers and continues on to the next frame (block 1335). None of the companion DMA components (e.g., route manager, companion router, companion wrapper) are reset, and the companion DMA components return to the idle state ready for the next frame configuration (block 1340). The companion DMA components are not reset because they were able to complete the given frame during which the companion wrapper error was detected. After block 1340, method 1300 ends.

Figure 14:
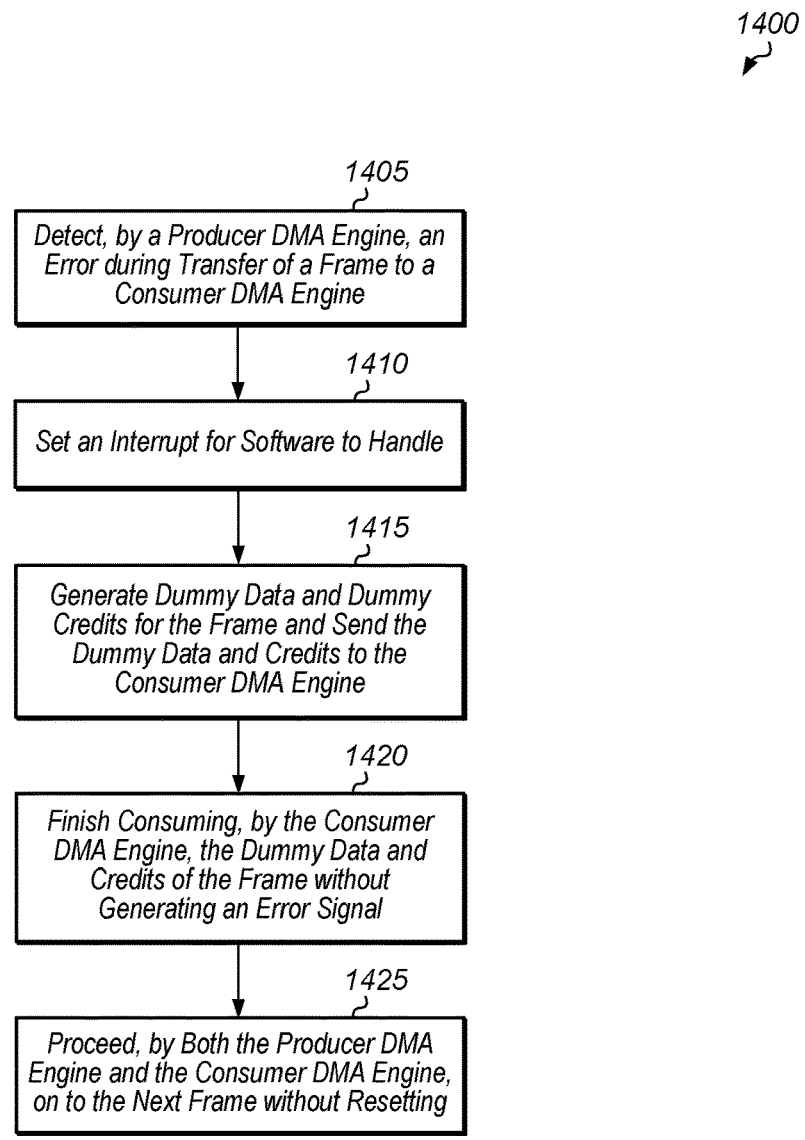
FIG. 14 is a flow diagram of one embodiment of a method for a producer DMA engine reacting to the detection of an error during transfer of a frame.

Turning now to FIG. 14, one embodiment of a method 1400 for a producer DMA engine reacting to the detection of an error during transfer of a frame is shown. A producer DMA engine detects an error during transfer of a frame (or a sub-frame) to a consumer DMA engine (block 1405). In response to detecting the error, the producer DMA engine sets an interrupt for software to handle (block 1410). Rather than hanging or stalling while waiting for software to process the interrupt, the producer DMA engine generates dummy data and dummy credits for the frame and sends the dummy data and credits to the consumer DMA engine (block 1415). In other words, the producer DMA engine continues to generate all of data and credits for the frame as if an error was not detected. This allows the consumer DMA engine to finish consuming the dummy data and credits of the first frame without generating an error signal (block 1420). Both the producer DMA engine and the consumer DMA engine proceed on to the next frame without resetting (block 1425). After block 1425, method 1400 ends. It is noted that method 1400 can be implemented for multiple producers and/or multiple consumers, with each producer and consumer performing the corresponding steps of method 1400.

Figure 15:
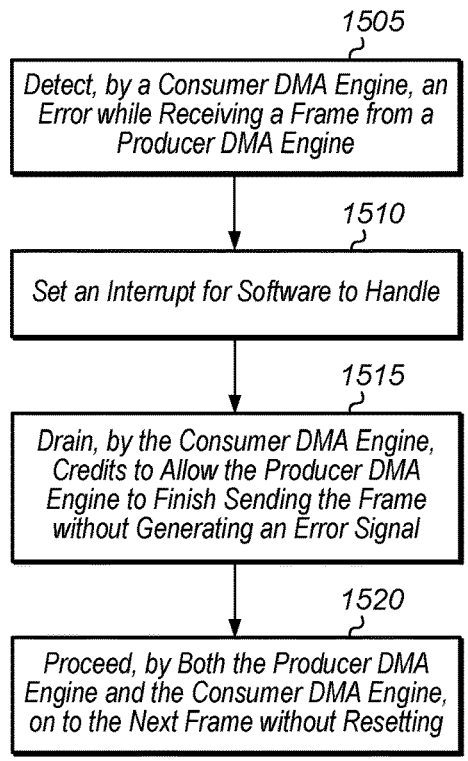
FIG. 15 is a flow diagram of one embodiment of a method for a consumer DMA engine reacting to the detection of an error during transfer of a frame.

Referring now to FIG. 15, one embodiment of a method 1500 for a consumer DMA engine reacting to the detection of an error during transfer of a frame is shown. A consumer DMA engine detects an error while receiving a frame (or a portion thereof) from a producer DMA engine (block 1505). In response to detecting the error, the consumer DMA engine sets an interrupt for software to handle (block 1510). Rather than hanging or stalling while waiting for software to process the interrupt, the consumer DMA engine drains credits received from the producer DMA engine to allow the producer DMA engine to finish sending the frame without generating an error signal (block 1515). Both the producer DMA engine and the consumer DMA engine proceed on to the next frame without resetting (block 1520). After block 1520, method 1500 ends. It is noted that method 1500 can involve multiple producers and/or multiple consumers, with each producer and consumer performing the corresponding steps of method 1500.

Figure 16:
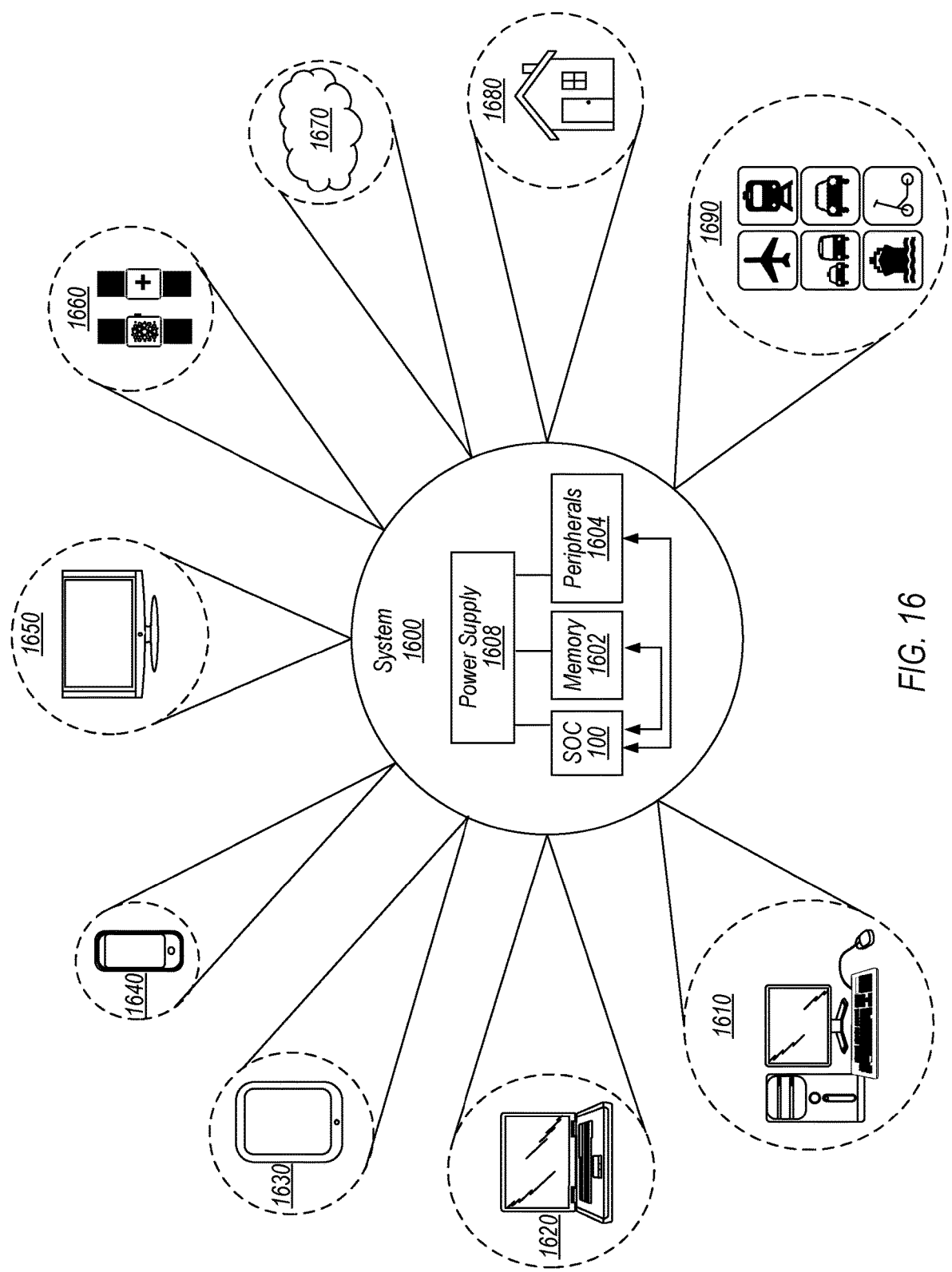
FIG. 16 is a block diagram of one embodiment of a system.

Referring now to FIG. 16, a block diagram of one embodiment of a system 1600 is shown that may incorporate and/or otherwise utilize the methods and mechanisms described herein. In the illustrated embodiment, the system 1600 includes at least a portion of SOC 100 (of FIG. 1) which may include multiple types of processing units, such as a central processing unit (CPU), a graphics processing unit (GPU), or otherwise, a communication fabric, and interfaces to memories and input/output devices. In some embodiments, one or more processors in SoC 100 includes at least one TLB. In various embodiments, SoC 100 is coupled to external memory 1602, peripherals 1604, and power supply 1608.

A power supply 1608 is also provided which supplies the supply voltages to SoC 100 as well as one or more supply voltages to the memory 1602 and/or the peripherals 1604. In various embodiments, power supply 1608 represents a battery (e.g., a rechargeable battery in a smart phone, laptop or tablet computer, or other device). In some embodiments, more than one instance of SoC 100 is included (and more than one external memory 1602 may be included as well).

The memory 1602 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1604 include any desired circuitry, depending on the type of system 1600. In one embodiment, peripherals 1604 include a streaming codec which is an interface between processing units on a SoC and another SoC over an interface (e.g., universal serial bus (USB)). For example, in a virtual reality (VR) system, one SoC is located in the VR headset while another SoC is on another device. These SoCs may communicate via the streaming codec. Peripherals 1604 may also include devices for various types of wireless communication, such as wifi, Bluetooth, cellular, global positioning system, etc. In some embodiments, the peripherals 1604 also include additional storage, including RAM storage, solid state storage, or disk storage. The peripherals 1604 include user interface devices such as a display screen, including touch display screens or multi-touch display screens, keyboard or other input devices, microphones, speakers, etc.

As illustrated, system 1600 is shown to have application in a wide range of areas. For example, system 1600 may be utilized as part of the chips, circuitry, components, etc., of a desktop computer 1610, laptop computer 1620, tablet computer 1630, cellular or mobile phone 1640, or television 1650 (or set-top box coupled to a television). Also illustrated is a smartwatch and health monitoring device 1660. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1600 may further be used as part of a cloud-based service(s) 1670. For example, the previously mentioned devices, and/or other devices, may access computing resources in the cloud (i.e., remotely located hardware and/or software resources). Still further, system 1600 may be utilized in one or more devices of a home 1680 other than those previously mentioned. For example, appliances within the home 1680 may monitor and detect conditions that warrant attention. For example, various devices within the home 1680 (e.g., a refrigerator, a cooling system, etc.) may monitor the status of the device and provide an alert to the homeowner (or, for example, a repair facility) should a particular event be detected. Alternatively, a thermostat may monitor the temperature in the home 1680 and may automate adjustments to a heating/cooling system based on a history of responses to various conditions by the homeowner. Also illustrated in FIG. 16 is the application of system 1600 to various modes of transportation 1690. For example, system 1600 may be used in the control and/or entertainment systems of aircraft, trains, buses, cars for hire, private automobiles, waterborne vessels from private boats to cruise liners, scooters (for rent or owned), and so on. In various cases, system 1600 may be used to provide automated guidance (e.g., self-driving vehicles), general systems control, and otherwise. These and many other embodiments are possible and are contemplated. It is noted that the devices and applications illustrated in FIG. 16 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

in some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function, For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a producer direct memory access (DMA) circuit; and
a consumer DMA circuit;
wherein the producer DMA circuit is configured to:
detect a first error during transfer of a first frame from the producer DMA circuit to the consumer DMA circuit; and
generate dummy data for the first frame and send the dummy data to the consumer DMA circuit responsive to detecting the first error; and
wherein the consumer DMA circuit is configured to finish consuming the dummy data of the first frame without resetting.

2. The apparatus as recited in claim 1, wherein responsive to the consumer DMA circuit detecting a second error in a second frame transferred from the producer DMA circuit, the consumer DMA circuit is configured to:
drain credits received from the producer DMA circuit to allow the producer DMA circuit to finish sending the second frame without resetting; and
proceed to a third frame without resetting.

3. The apparatus as recited in claim 1, further comprising:
a route manager circuit; and
a companion router circuit configured to:
receive an indication of a second error during transfer of a second frame from the consumer DMA circuit; and
send a frame abort message to the route manager circuit responsive to receiving the indication of the second error during transfer of the second frame;
wherein responsive to receiving the frame abort message, the route manager circuit is configured to wait until the consumer DMA circuit finishes consuming the first frame and is actively consuming the second frame before forwarding the frame abort message to the consumer DMA circuit.

4. The apparatus as recited in claim 3, wherein responsive to receiving the frame abort message, the consumer DMA circuit is configured to flush a pipeline and transition to an idle state to wait for a third frame after receiving the frame abort message.

5. The apparatus as recited in claim 4, further comprising a first companion wrapper circuit, wherein responsive to receiving the frame abort message from the route manager circuit, the first companion wrapper circuit is configured to:
set a first local buffer pointer to zero; and
transition from a done state to a reset state to be ready for the third frame from the route manager circuit.

6. The apparatus as recited in claim 5, wherein responsive to receiving the frame abort message, the consumer DMA circuit is further configured to:
discard incoming data that is received;
reset and flush a processing pipeline and DMA configuration; and
assert a first active frame end signal to the first companion wrapper circuit.

7. The apparatus as recited in claim 6, wherein the route manager circuit is further configured to set a read buffer pointer and a write buffer pointer to zero after receiving the frame abort message.

8. A method, comprising:
detecting, by a producer direct memory access (DMA) circuit, a first error during transfer of a first frame from the producer DMA circuit to a consumer DMA circuit;
generating, by the producer DMA circuit, dummy data for the first frame and send the dummy data to the consumer DMA circuit responsive to detecting the first error; and
finishing consuming, by the consumer DMA circuit, a the dummy data of the first frame without resetting.

9. The method as recited in claim 8, wherein responsive to the consumer DMA circuit detecting a second error in a second frame transferred from the producer DMA circuit, the method further comprising the consumer DMA circuit:
draining credits received from the producer DMA circuit to allow the producer DMA circuit to finish sending the second frame without resetting; and
proceeding to a third frame without resetting.

10. The method as recited in claim 8, further comprising:
receiving, by a companion router circuit, an indication of a second error during transfer of a second frame from the consumer DMA circuit;
sending, by the companion router circuit, a frame abort message to a route manager circuit responsive to receiving the indication of the second error during transfer of the second frame; and
responsive to receiving the frame abort message, waiting, by the route manager circuit, until the consumer DMA circuit finishes consuming the first frame and is actively consuming the second frame before forwarding the frame abort message to the consumer DMA circuit.

11. The method as recited in claim 10, wherein responsive to receiving the frame abort message, the method further comprising flushing, by the consumer DMA circuit, a pipeline and transitioning to an idle state to wait for a third frame after receiving the frame abort message.

12. The method as recited in claim 11, wherein responsive to receiving the frame abort message, the method further comprising:

setting, by a first companion wrapper circuit, a first local buffer pointer to zero; and transitioning, by the first companion wrapper circuit, from a done state to a reset state to be ready for the third frame from the route manager circuit.

13. The method as recited in claim 12, wherein responsive to receiving the frame abort message from the route manager circuit, the method further comprises:

discarding, by the consumer DMA circuit, incoming data that is received;

resetting and flushing a processing pipeline and DMA configuration; and asserting a first active frame end signal to the first companion wrapper circuit.

14. The method as recited in claim 13, further comprising setting, by the route manager circuit, a read buffer pointer and a write buffer pointer to zero after receiving the frame abort message.

15. A system, comprising:

a producer direct memory access (DMA) circuit;

a display; and a consumer DMA circuit configured to cause pixels to be driven to the display;

wherein the producer DMA circuit is configured to:

detect a first error during transfer of a first frame from the producer DMA circuit to the consumer DMA circuit; and generate dummy data for the first frame and send the dummy data to the consumer DMA circuit responsive to detecting the first error;

wherein the consumer DMA circuit is configured to finish consuming the dummy data of the first frame without resetting.

16. The system as recited in claim 15, wherein responsive to the consumer DMA circuit detecting a second error in a second frame transferred from the producer DMA circuit, the consumer DMA circuit is configured to:

drain credits received from the producer DMA circuit to allow the producer DMA circuit to finish sending the second frame without resetting; and proceed to a third frame without resetting.

17. The system as recited in claim 15, further comprising:

a route manager circuit; and a companion router circuit configured to:

receive an indication of a second error during transfer of a second frame; and send a frame abort message to the route manager circuit responsive to receiving the indication of the second error during transfer of the second frame;

wherein responsive to receiving the frame abort message, the route manager circuit is configured to wait until the consumer DMA circuit finishes consuming the first frame and is actively consuming the second frame before forwarding the frame abort message to the consumer DMA circuit.

18. The system as recited in claim 17, wherein responsive to receiving the frame abort message, the consumer DMA circuit is configured to flush a pipeline and transition to an idle state to wait for a third frame after receiving the frame abort message.

19. The system as recited in claim 18, further comprising a first companion wrapper circuit, wherein responsive to receiving the frame abort message from the route manager circuit, the first companion wrapper circuit is configured to:

set a first local buffer pointer to zero; and transition from a done state to a reset state to be ready for the third frame from the route manager circuit.

20. The system as recited in claim 19, wherein responsive to receiving the frame abort message, the consumer DMA circuit is further configured to:

discard incoming data that is received;

reset and flush a processing pipeline and DMA configuration; and assert a first active frame end signal to the first companion wrapper circuit.

* * * * *